(12) United States Patent
Ishikuri

(10) Patent No.: US 10,152,368 B2
(45) Date of Patent: Dec. 11, 2018

(54) RECORDING APPARATUS AND CONTROL METHOD FOR RECORDING APPARATUS

(71) Applicant: CANON KABUSHIKI KAISHA, Tokyo (JP)

(72) Inventor: Ryuichi Ishikuri, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 254 days.

(21) Appl. No.: 14/596,501

(22) Filed: Jan. 14, 2015

(65) Prior Publication Data

US 2015/0205662 A1    Jul. 23, 2015

(30) Foreign Application Priority Data

Jan. 17, 2014 (JP) ................................ 2014-007273

(51) Int. Cl.
*G06F 11/07* (2006.01)

(52) U.S. Cl.
CPC ...... *G06F 11/0793* (2013.01); *G06F 11/0727* (2013.01)

(58) Field of Classification Search
CPC ............. G06F 11/0793; G06F 11/0727; G06F 11/073; G06F 11/0751
See application file for complete search history.

(56) References Cited

U.S. PATENT DOCUMENTS

| 2003/0142687 A1* | 7/2003 | Lin | H04L 7/0029 370/419 |
| 2009/0044038 A1* | 2/2009 | Lee | G06F 1/08 713/501 |
| 2010/0020435 A1* | 1/2010 | Chen | B82Y 10/00 360/77.02 |
| 2011/0019787 A1* | 1/2011 | Nygren | G11C 7/1045 375/371 |

(Continued)

FOREIGN PATENT DOCUMENTS

| CN | 101860672 A | 10/2010 |
| CN | 102385912 A | 3/2012 |

(Continued)

OTHER PUBLICATIONS

Korean Office Action issued in corresponding application No. 10-2015-0006523 dated Nov. 21, 2016.

(Continued)

*Primary Examiner* — Jigar P Patel
(74) *Attorney, Agent, or Firm* — Carter, DeLuca, Farrell & Schmidt, LLP

(57) ABSTRACT

There is provided a recording apparatus. An output unit outputs a clock signal to a storage device. A communication unit outputs, to the storage device, a write command and data to be written in accordance with the clock signal in order to write the data into the storage device, and receives data for a response to the write command from the storage device in accordance with a timing signal. A generating unit generates the timing signal by delaying the clock signal. A detecting unit detects an error regarding the data received by (Continued)

the communication unit. A control unit carries out an adjustment process on a delay amount in the timing signal in response to the detecting unit detecting an error.

27 Claims, 6 Drawing Sheets

(56) References Cited

U.S. PATENT DOCUMENTS

| | | | | |
|---|---|---|---|---|
| 2011/0093753 A1* | 4/2011 | Takagi | ............... | G06F 11/1004 714/746 |
| 2011/0098977 A1* | 4/2011 | Shang | .............. | G01R 31/31718 702/186 |
| 2012/0260277 A1* | 10/2012 | Kosciewicz | ......... | H04N 17/004 725/14 |

FOREIGN PATENT DOCUMENTS

| | | | |
|---|---|---|---|
| CN | 102385913 | A | 3/2012 |
| JP | 2001-218165 | A | 8/2001 |
| JP | 2004-192488 | A | 7/2004 |
| JP | 2010-244399 | A | 10/2010 |
| JP | 2011-090361 | A | 5/2011 |
| JP | 2012-054715 | A | 3/2012 |

OTHER PUBLICATIONS

Chinese Office Action issued in corresponding application No. 201510021424.0 dated Jun. 13, 2017.
Japanese Office Action dated Oct. 30, 2017 in corresponding Japanese Patent Application No. 2014-007273, 8 pages.

* cited by examiner

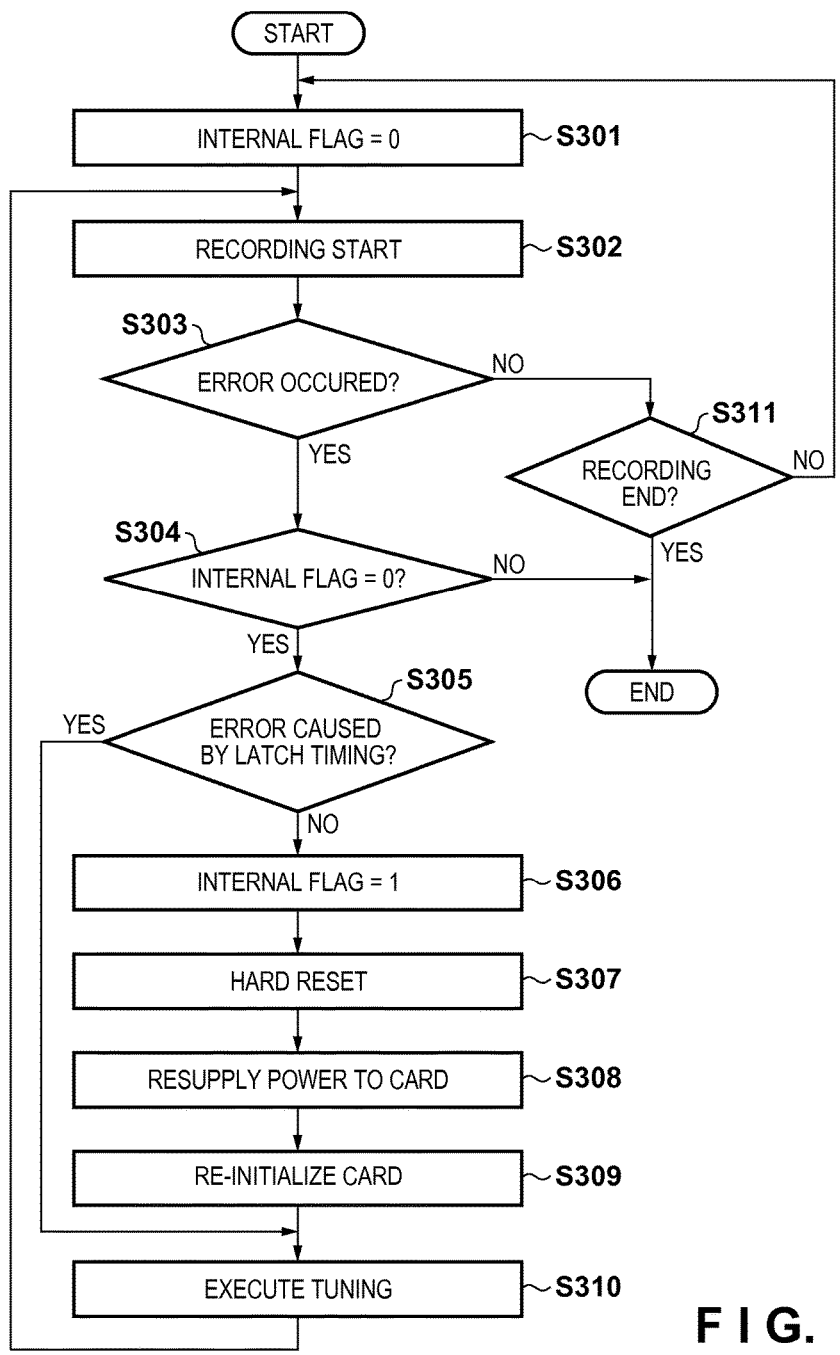
F I G. 3

RECORDING APPARATUS AND CONTROL METHOD FOR RECORDING APPARATUS

BACKGROUND OF THE INVENTION

Field of the Invention

The present invention relates to a recording apparatus and a control method for a recording apparatus.

Description of the Related Art

At present, there are apparatuses that write image data, audio data, and so on into a recording medium such as a memory card or read out and play back data recorded into a recording medium. The reading and writing of data between an apparatus to which a recording medium is connected (a host apparatus) and the recording medium is carried out based on a clock signal generated by the host apparatus. The data to be written or read is sent/received, or a response to a command is received, after the host apparatus sends a single clock pulse of the clock signal. The clock pulse and the data, the response, or the like are thus not necessarily sent/received in perfect synchronization. For example, in the case where the host apparatus reads out data from a recording medium such as an SD memory card, there is delay, equivalent to a standardized fixed value, from when the host apparatus supplies the clock pulse to the recording medium to when the data is actually sent. Accordingly, the host apparatus obtains the data sent from the recording medium by latching the data sent from the recording medium at a timing delayed from the sending of the clock pulse by an amount equivalent to the fixed value.

Recent years have seen increases in data rates for reading and writing from and to such recording media, making it necessary to accelerate the sending of clock pulses, and it has thus become difficult to use fixed values to define amounts of delay from clock pulses for obtaining data. Meanwhile, UHS-I (Ultra High Speed-I), which is a high-speed standard for SD memory cards, defines reading out data after adjusting the timing of the data latch on a card-by-card basis, when reading out data using a high-speed clock. Adjusting the latch timing in this manner is called "tuning" (see Japanese Patent Laid-Open No. 2012-54715, for example).

However, tuning takes time, and data cannot be written or read during the tuning. Accordingly, if, for example, tuning is carried out while an image is being recorded in a digital camera, the speed of continuous shooting, the number of continuous shots, or the like may drop.

SUMMARY OF THE INVENTION

Having been achieved in light of the aforementioned situation, the present invention provides a technique that reduces the frequency of tuning while recording images.

According to an aspect of the present invention, there is provided a recording apparatus comprising: an output unit configured to output a clock signal to a storage device; a communication unit configured to output, to the storage device, a write command and data to be written in accordance with the clock signal in order to write the data into the storage device, and configured to receive data for a response to the write command from the storage device in accordance with a timing signal; a generating unit configured to generate the timing signal by delaying the clock signal; a detecting unit configured to detect an error regarding the data received by the communication unit; and a control unit configured to carry out an adjustment process on a delay amount in the timing signal in response to the detecting unit detecting an error.

According to another aspect of the present invention, there is provided a control method for a recording apparatus, wherein the recording apparatus comprises: an output unit configured to output a clock signal to a storage device; a communication unit configured to output, to the storage device, a write command and data to be written in accordance with the clock signal in order to write the data into the storage device, and configured to receive data for a response to the write command from the storage device in accordance with a timing signal; and a generating unit configured to generate the timing signal by delaying the clock signal, the control method comprising: a detecting step of detecting an error regarding the data received by the communication unit; and a control step of carrying out an adjustment process on a delay amount in the timing signal in response to an error being detected in the detecting step.

Further features of the present invention will become apparent from the following description of exemplary embodiments (with reference to the attached drawings).

BRIEF DESCRIPTION OF THE DRAWINGS

FIG. 3 is a flowchart illustrating a process in which the digital camera 100 controls the execution of tuning while the digital camera 100 is recording an image, according to the first embodiment.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
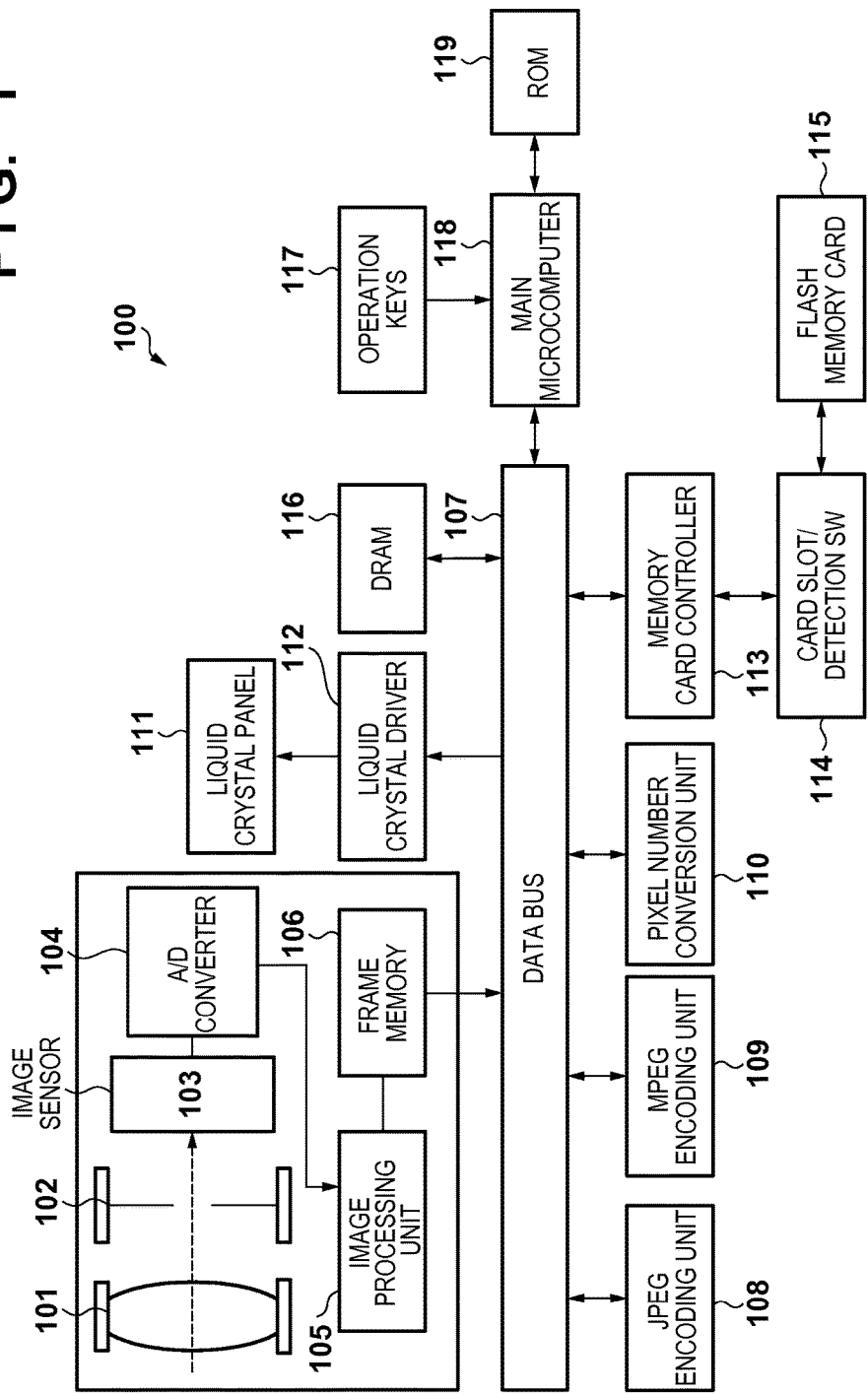
FIG. 1 is a block diagram illustrating an example of the configuration of a digital camera 100 according to a first embodiment.

An embodiment, in which a recording apparatus according to the present invention is applied to an image capturing apparatus such as a digital camera, will be described hereinafter. FIG. 1 is a block diagram illustrating an example of the configuration of a digital camera 100 according to a first embodiment. In FIG. 1, an image capturing lens 101 captures an image of a subject, and the subject image is then formed on an image sensor 103 after a light amount thereof has been restricted to a predetermined amount by an aperture 102. The subject image that has been formed is digitized by an A/D converter 104. The digitized image data undergoes processes such as gamma correction, white balance correction, noise reduction, and the like in an image processing unit 105, and is then output as uncompressed image data to a data bus 107.

A JPEG encoding unit 108 encodes a single frame's worth of the uncompressed image data output from a frame memory 106 in JPEG format so as to reduce the data size thereof, and generates compressed still image data as a result. An MPEG encoding unit 109 encodes uncompressed moving image data output from the frame memory 106 in MPEG format so as to reduce the data size thereof, and generates compressed moving image data as a result.

A liquid crystal panel 111 serves as a display unit for displaying images, various types of information, and so on. A liquid crystal driver 112 converts data for displaying images, stored in a DRAM 116, into a liquid crystal display signal and supplies the signal to the liquid crystal panel 111. Image data for display written into the DRAM 116 is thus displayed by the liquid crystal panel 111 via the liquid crystal driver 112 in this manner. The liquid crystal panel 111 can also function as an electronic viewfinder and display through-the-lens images. In the case where the liquid crystal panel 111 is caused to function as an electronic viewfinder, the liquid crystal driver 112 reduces the resolution of the digital signal obtained from the A/D conversion performed by the A/D converter 104 and stored in the DRAM 116 in accordance with the number of pixels in the liquid crystal panel 111. The liquid crystal driver 112 then converts the digital signal into the liquid crystal display signal and sequentially transfers the signal to the liquid crystal panel 111.

The DRAM 116 provides a buffer memory space for temporarily storing the still image data generated by the JPEG encoding unit 108 or the moving image data generated by the MPEG encoding unit 109. A main microcomputer 118 stores the still image data or the moving image data in the DRAM 116 until the still image data or the moving image data is written into a flash memory card 115 (a recording medium) via a memory card controller 113. The DRAM 116 also provides a work memory space for a pixel number conversion unit 110 that generates thumbnail images used in an index display made when playing back images that have been captured. Furthermore, as described earlier, the DRAM 116 also provides a space that serves as a moving image memory for carrying out displays in the liquid crystal panel 111.

The flash memory card 115 can be attached to/removed from the digital camera 100 via a card slot/detection SW 114. The flash memory card 115 includes, for example, NAND flash memory and a controller, or a communication terminal or the like for transmitting and receiving clock signals, commands, data, and so on with the digital camera 100. The controller of the flash memory card 115 writes and reads data into and from the flash memory in response to commands from the digital camera 100. The controller of the flash memory card 115 generates responses to commands from the digital camera 100 and sends those responses to the digital camera 100 in synchronization with the clock signal from the digital camera 100. Furthermore, in the case where the digital camera 100 has sent a command requesting the sending of test data for the purpose of tuning, the controller of the flash memory card 115 sends the test data to the digital camera 100, as will be described later. The flash memory card 115 records data in a format compliant with the FAT (File Allocation Table) filesystem, for example.

The memory card controller 113 controls the flash memory card 115 and records data from the DRAM 116 into the flash memory card 115. The memory card controller 113 also reads out data from the flash memory card 115 and transfers the data to the DRAM 116. The card slot/detection SW 114 is a slot for mounting the flash memory card 115, and includes a detection SW (switch) for detecting whether or not a card is mounted in the slot.

Operation keys 117 correspond to various types of switches for accepting various types of operations from a user, and include a shutter button for executing an operation for shooting a still image, a trigger button for instructing the recording of moving image to start and stop, and a mode switch for toggling between a camera shooting mode and a playback mode.

A ROM 119 is a non-volatile memory capable of being electrically erased and recorded to, and stores operational constants, programs, and the like for the main microcomputer 118. "Programs" as mentioned here refers to programs for executing various types of sequences, described later, according to the present embodiment, and these programs realize the respective operations of the present embodiment as described later.

The main microcomputer 118 includes a CPU that operates in accordance with the programs stored in the ROM 119. The main microcomputer 118 carries out display control by controlling the liquid crystal driver 112 and the like. Furthermore, in the present embodiment, the main microcomputer 118 uses a tuning pattern signal having the same pattern as a pattern stored in the flash memory card 115 to carry out operations for determining the success/failure of a test pattern and for setting an optimal latch timing, which will be mentioned later.

Figure 2:
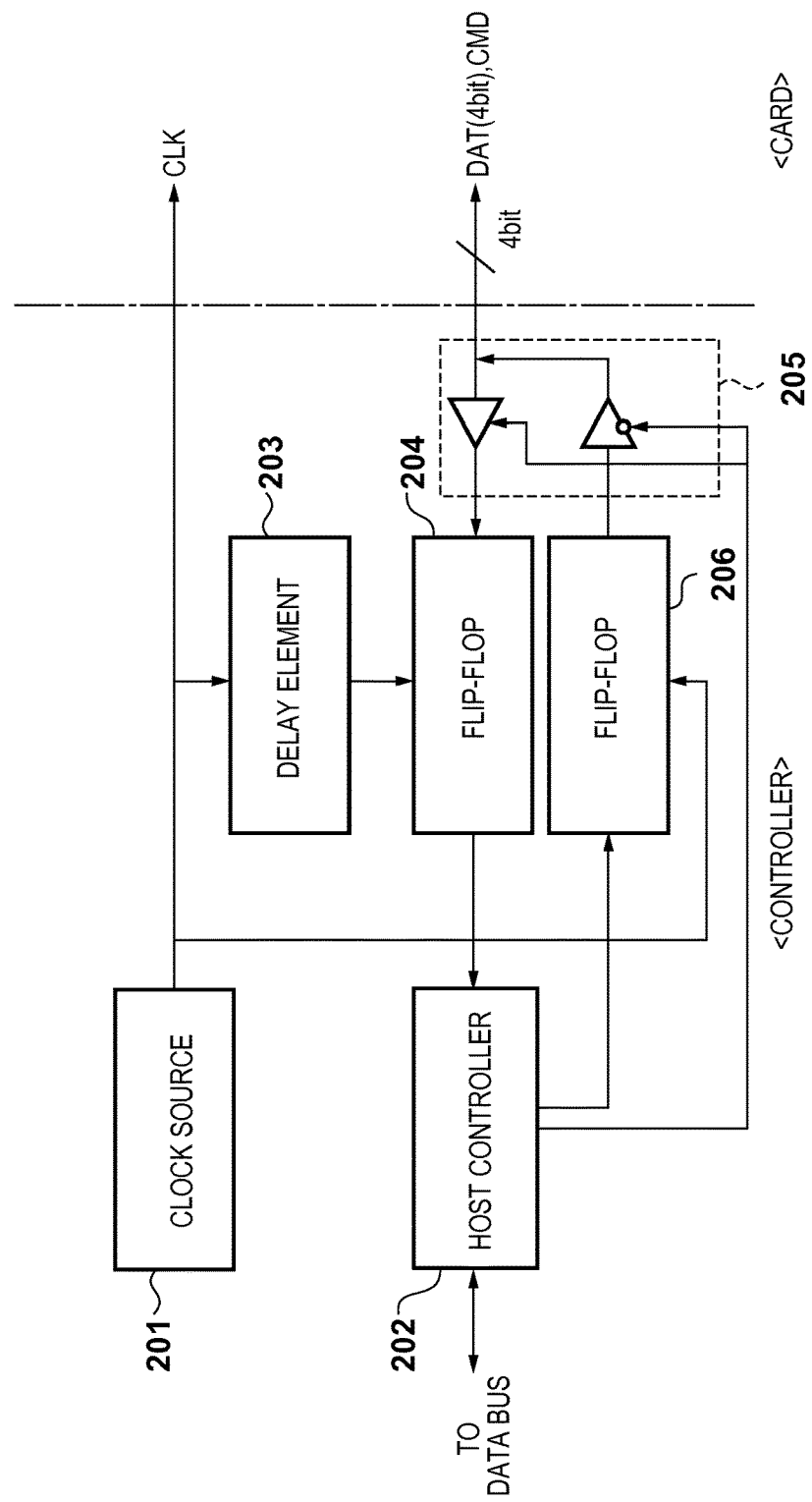
FIG. 2 is a block diagram illustrating a memory card controller 113 in detail.

FIG. 2 is a block diagram illustrating the memory card controller 113 in detail. When data is written into and read out from the flash memory card 115, the memory card controller 113 sends and receives signals and data via a CLK line, a CMD line, and a DAT line. Specifically, a clock source 201 outputs, via the CLK line, a clock signal (CLK signal) configured of clock pulses, which is used to control the timing of reading and writing. A host controller 202 outputs command signals for reading and writing, and receives response signals from the flash memory card 115 in response to commands, via the CMD line. The host controller 202 also controls the sending and receiving of data to be written into the flash memory card 115 or data to be read out from the flash memory card 115 via the DAT line.

When reading and writing data, the clock pulses and the sending/receiving of the data occur at different timings, as mentioned earlier. Accordingly, a delay element 203 delays the phase of the clock signal under the control of the main microcomputer 118 when, for example, data is read out from the flash memory card 115, and generates a timing signal for latching the data output from the flash memory card 115. A flip-flop 204 latches the data output from the flash memory card 115 in accordance with the timing signal output from the delay element 203. In other words, the timing signal defines the timing at which the data is latched. Meanwhile, a flip-flop 206 latches the data sent from the host controller 202 to the flash memory card 115 in accordance with the timing provided by the clock source 201. Note that switching between the CMD line and the DAT line depending on whether commands are input/output or data is exchanged is carried out using a signal branching unit 205.

Next, tuning operations according to the present embodiment will be described with reference to FIGS. 1 and 2. The memory card controller 113 issues a test data send command to the flash memory card 115. In response, the flash memory card 115 sends a 64-byte data string having a predetermined pattern (that is, test data) in synchronization with the clock signal sent from the clock source 201. The memory card controller 113 receives the test data sent from the flash memory card 115 at a latch timing generated by the clock source 201. Here, a phase relationship between the clock signal and the latch timing can be varied by varying the value of a number of delay stages set in the delay element 203. The main microcomputer 118 determines the success/failure of the test data reception while varying the phase relationship, or in other words, while varying the latch timing. The main microcomputer 118 then sets the latch timing at which the test data reception succeeds in the most stable manner. In this manner, the main microcomputer 118 carries out a tuning process for setting an appropriate latch timing (that is, a process for adjusting the amount of delay of the timing signal). Meanwhile, image data cannot be written to or read from the flash memory card 115 while the tuning process is underway.

Next, a process in which the digital camera 100 controls the execution of tuning while the digital camera 100 is recording an image will be described with reference to FIG. 3. FIG. 3 particularly illustrates continuous shooting operations in which the digital camera 100 shoots, generates, and records multiple frames' worth of still image data in succession. Even during recording, it is necessary to receive, from the flash memory card 115, a response to a write command output to the flash memory card 115. It is therefore desirable to receive the data at an appropriate latch timing during recording as well. Meanwhile, images recorded through continuous still image shooting operations generally have a large data size. As such, if the writing of data is interfered with by tuning, the speed of continuous shooting, the number of continuous shots, or the like may drop. It is therefore particularly effective to reduce the frequency at which tuning is carried out during the recording involved with continuous still image shooting operations. However, the present embodiment is not limited to continuous still image shooting operations, and can be applied in any situation where an image is recorded.

Note that the entirety of the flowchart shown in FIG. 3 corresponds to a still image continuous shooting sequence (S603 in FIG. 6) according to the second embodiment, which will be described later.

The processing of the flowchart in FIG. 3 starts when a user presses the shutter button in the operation keys 117 and continuous shooting operations are started. First, in step S301, the main microcomputer 118 initializes an internal flag to 0, and stores the flag in the DRAM 116. The internal flag is a flag for managing whether or not a hard reset (S307), power being resupplied to the flash memory card 115 (S308), and the flash memory card 115 being re-initialized (S309), which will be mentioned later, have been executed. The processes of step S307 to step S309 will be collectively referred to as a "re-initialization process".

In step S302, the main microcomputer 118 starts (or continues, if already started) the recording of multiple frames' worth of still images resulting from the continuous shooting operations into the flash memory card 115. In step S303, the main microcomputer 118 determines, via the memory card controller 113, whether or not an access error has occurred for the flash memory card 115. The process moves to step S311 in the case where an error has not occurred and moves to step S304 in the case where an error has occurred.

In step S304, the main microcomputer 118 checks the internal flag stored in the DRAM 116. In the case where the internal flag is 0, the re-initialization process of step S307 to step S309, mentioned later, has not yet been executed. The process thus advances to step S305. In the case where the internal flag is 1, the error has not been cleared despite the re-initialization process of step S307 to step S309 having been executed (in other words, an error has occurred during retry recording, which will be described later). Accordingly, the main microcomputer 118 ends the processing without performing another re-initialization process, another retry recording (or command input/output), and so on.

In step S305, the main microcomputer 118 checks whether or not the error that has occurred is a predetermined type of error caused by the latch timing. A command response CRC error, a read data CRC error, a command response timeout error, a read data timeout error, a CRC status timeout error, and so on can be given as examples of this predetermined type of error. These errors can occur due to the latch timing with respect to inputs to the CMD line or the DAT line, and it is thus thought that such errors are highly likely to be correctable through tuning. Errors in the flash memory card 115, such as an R1 response card status error, a busy timeout during a write, and so on can be given as examples of types of errors that are different from the stated predetermined type. Here, an R1 response is data sent by the flash memory card 115 as a response to a specific command such as a write command when such a specific command has been output to the card. The R1 response contains card status data for determining whether or not the status of the memory card is normal. In the case where the card status data indicates that the status is not normal, the main microcomputer 118 determines that the data indicates an error. It is highly likely that such errors will not be corrected through tuning.

In the case where the error that has occurred is not the predetermined type of error, it is unlikely that the error will be corrected through tuning alone. Accordingly, the main microcomputer 118 completely re-initializes the states of the memory card controller 113 and the flash memory card 115 through the series of processes from step S306 to step S309.

Specifically, in step S306, the main microcomputer 118 sets the internal flag to 1, and stores the flag in the DRAM 116. In step S307, the main microcomputer 118 resets the memory card controller 113. In step S308, the main microcomputer 118 temporarily reduces a voltage supplied to the flash memory card 115 to 0 V and then supplies a predetermined voltage again, via the memory card controller 113. Doing so resets the state of the flash memory card 115. In step S309, the main microcomputer 118 re-initializes the flash memory card 115 via the memory card controller 113. This re-initialization includes exchanging predetermined commands and changing the supplied voltage, and is the same process as that carried out when normally initializing the flash memory card 115. Then, in step S310, the main microcomputer 118 carries out tuning for the flash memory card 115.

Meanwhile, in the case where, in step S305, the error that has occurred is a predetermined type of error caused by the latch timing, the main microcomputer 118 skips the stated processes of step S306 to step S309 and moves to step S310. Then, the main microcomputer 118 carries out tuning for the flash memory card 115.

When the tuning of step S310 is complete, the process returns to step S302, where the main microcomputer 118 starts the retry recording for the flash memory card 115. Here, "retry recording" is a process for re-recording only the same number of blocks in the same data at the same card address as when the error occurred. In the case where an error occurred in the input/output of a command, the main microcomputer 118 once again inputs/outputs that command.

In the case where an error has not occurred in step S303, the main microcomputer 118 determines, in step S311, whether or not to end the recording of still image data through the continuous shooting operations by determining whether or not the user is still holding the shutter button in the operation keys 117. In the case where the shutter button is not being held, the main microcomputer 118 determines to end the continuous shooting operations, whereupon the processing illustrated in this flowchart ends. On the other hand, in the case where the shutter button is still being held, the main microcomputer 118 returns the process to step S301 and repeats the aforementioned operations.

The flowchart in FIG. 3 illustrates control for executing tuning during the recording of images. However, these operations are not limited to the recording of images, and the digital camera 100 may be configured to execute tuning in the case where any kind of error has occurred in the input/output of commands or data to/from the flash memory card 115.

As described thus far, according to the first embodiment, the digital camera 100 carries out tuning for the flash memory card 115 in response to an error occurring when accessing the flash memory card 115 during the recording of an image.

Through this, the frequency at which tuning is carried out when recording an image can be reduced, which in turn makes it possible to suppress situations in which the tuning interferes with the writing of data.

Second Embodiment

As described earlier, the first embodiment can be applied in any situation where an image is recorded. However, in the case where the image to be recorded has a small data size, it is not a serious problem if the tuning is carried out during recording and thus interferes with the writing of data. Accordingly, the second embodiment describes a configuration in which tuning is carried out periodically even during recording in the case of a recording mode that carries out control limiting the amount of data to be recorded per unit of time to no greater than a threshold (a "data amount control recording mode" hereinafter). The following describes a moving image recording mode that records moving image data encoded in the MPEG format, which executes interframe predictive coding. The data amount control recording mode is not limited to a moving image recording mode, however.

In the present embodiment, the basic configurations of the digital camera 100 and the memory card controller 113 are the same as in the first embodiment (see FIGS. 1 and 2). The following will primarily describe areas that are different from the first embodiment.

First, a process in which the digital camera 100 controls the execution of tuning while the digital camera 100 is recording moving image data in the case of the moving image recording mode will be described with reference to FIG. 4. In other words, in the present embodiment, the tuning process is executed at a predetermined timing during a period from when the user makes an instruction to start recording moving image to when the user makes an instruction to stop recording moving image. Note that the entirety of the flowchart shown in FIG. 4 corresponds to a moving image recording sequence (S602 in FIG. 6) which will be mentioned later.

Figure 4:
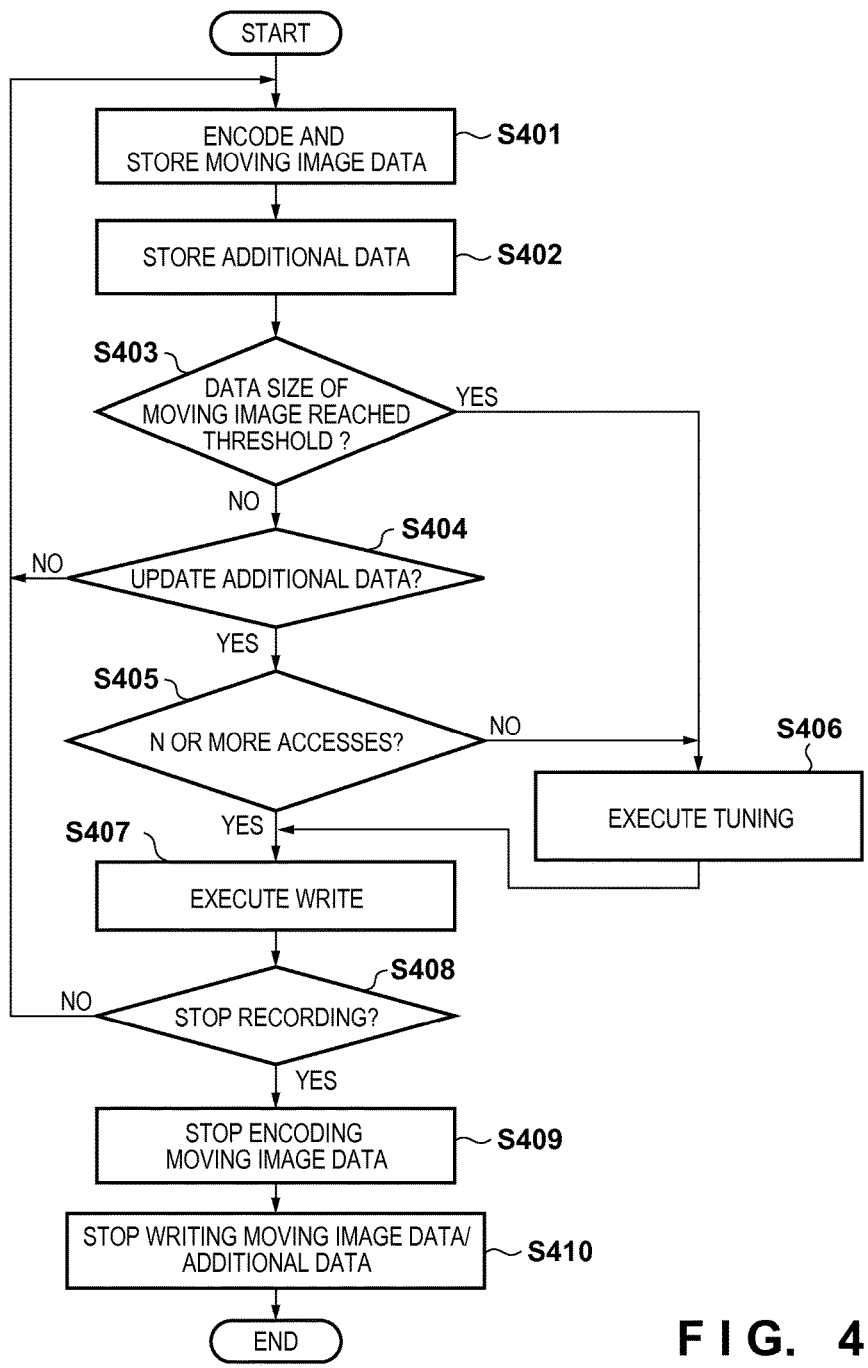
FIG. 4 is a flowchart illustrating a process in which the digital camera 100 controls the execution of tuning while the digital camera 100 is recording moving image data in the case of a moving image recording mode, according to a second embodiment.

The processing of the flowchart shown in FIG. 4 starts when the user instructs moving image recording to start by operating the operation keys 117. First, in step S401, the main microcomputer 118 encodes the moving image data by controlling the MPEG encoding unit 109, and stores the encoded moving image data in a region of the DRAM 116 allocated for the moving image data.

In step S402, the main microcomputer 118 stores additional data, such as a time code required to play back the moving image, metadata, and the like, in a region of the DRAM 116 allocated for additional data. Note that in the present embodiment, the data size of each piece of additional data is very small compared to the moving image data, and is a size equivalent to only several sectors in the flash memory card 115. Unlike the moving image data, the additional data is written into non-consecutive (random) addresses in the flash memory card 115. As such, when the additional data is written, small-size writes are executed in sequence.

In step S403, the main microcomputer 118 determines whether or not the data size (data amount) of the unrecorded moving image data stored in the DRAM 116 in step S401 has reached a predetermined threshold. In the present embodiment, the threshold is represented by $\alpha$ MB. In the case where the data size of the unrecorded moving image data stored in the DRAM 116 has reached $\alpha$ MB, the process moves to step S406. However, in the case where the data size of the moving image data has not reached $\alpha$ MB, the process moves to step S404.

In step S404, the main microcomputer 118 determines whether or not it is necessary to update the additional data in the flash memory card 115. In the case where the update is necessary, the process moves to step S405. However, in the case where the update is not necessary, the process returns to step S401 and the encoding of the moving image data continues.

In step S405, the main microcomputer 118 determines whether or not the writing of the additional data into the flash memory card 115 will occur N times or more. The process moves to step S407 in the case where the writing will occur N times or more, and moves to step S406 in the case where the writing will not occur N times or more.

In step S406, the main microcomputer 118 carries out the tuning process for the flash memory card 115 by controlling the memory card controller 113. Accordingly, in the present embodiment, tuning is carried out in the case where the data size of the unrecorded moving image data stored in the DRAM 116 has reached the threshold (YES in step S403), and in the case where it is necessary to update the additional data and fewer than N accesses will be made (YES in step S404, NO in step S405).

In step S407, the main microcomputer 118 issues a write command to the flash memory card 115 by controlling the memory card controller 113. The main microcomputer 118 then writes the data held in the DRAM 116 into the flash memory card 115.

In step S408, the main microcomputer 118 determines whether or not to stop the moving image recording. For example, the main microcomputer 118 determines to stop the moving image recording in the case where the flash memory card 115 has become full, the case where the user has instructed the recording to stop by operating the operation keys 117, and so on. In the case where the moving image recording is not to be stopped, the process returns to step S401, where the main microcomputer 118 continues the moving image recording. However, the process moves to step S409 in the case where the moving image recording is to be stopped.

In step S409, the main microcomputer 118 stops encoding the moving image data. In step S410, the main microcomputer 118 stops writing the moving image data and the additional data into the flash memory card 115.

Figure 5:
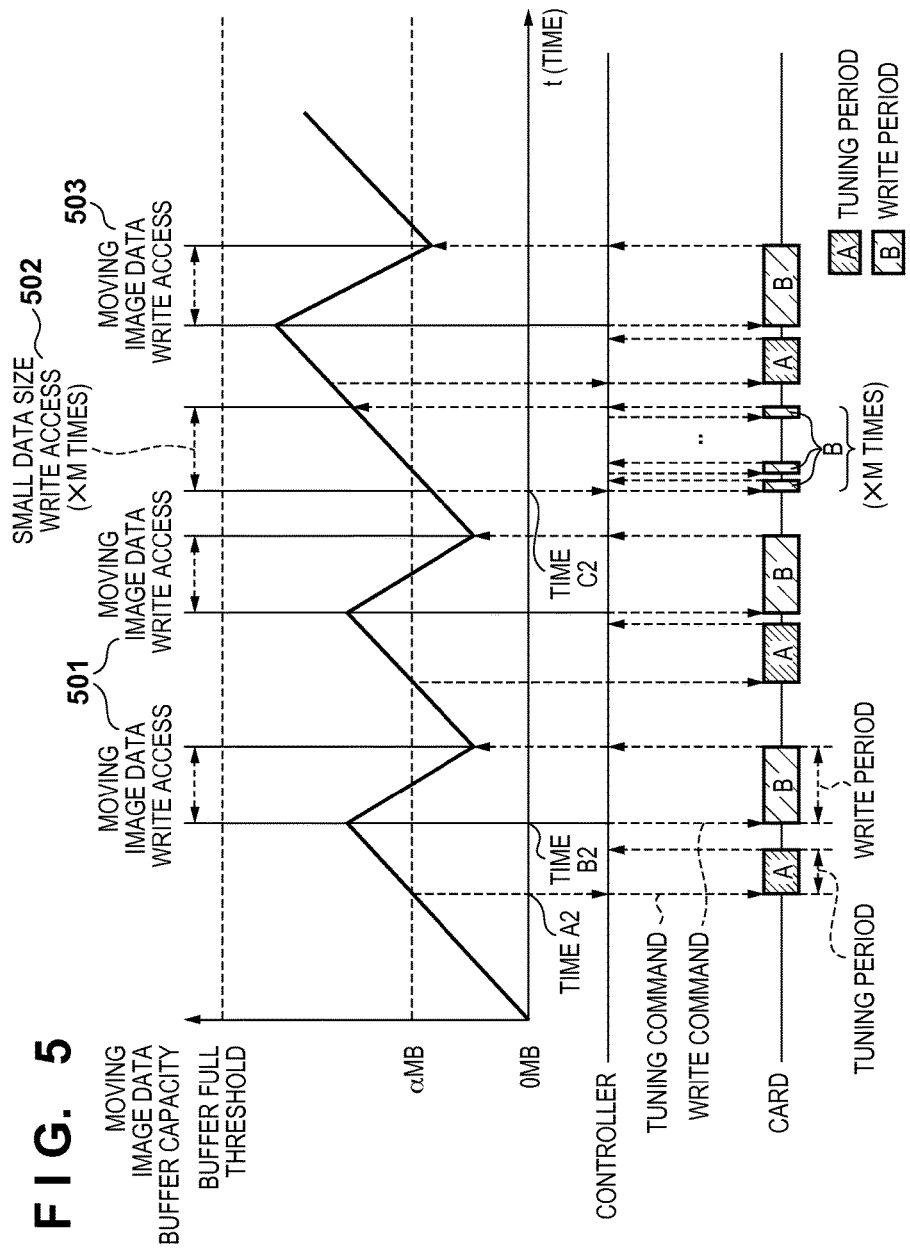
FIG. 5 is a diagram illustrating a storage state of data in a DRAM 116 and the timing at which data writing and a tuning process are executed for a flash memory card 115 during moving image recording.

FIG. 5 is a diagram illustrating a storage state of data in the DRAM 116 and the timing at which data writing and the tuning process are executed for the flash memory card 115 during moving image recording. The vertical axis in FIG. 5 indicates the data size of the unrecorded moving image data stored in a moving image data buffer region prepared in the DRAM 116 for the purpose of temporarily storing the unrecorded moving image data. The horizontal axis in FIG. 5 represents time t. Note that the moving image data buffer region is allocated in the DRAM 116.

Reference numerals 501 and 503 indicate periods of write access in which the moving image data stored in the moving image data buffer is written into the flash memory card 115. Reference numeral 502 indicates a period in which M write accesses occur, for small-sized data equivalent to several sectors, as with additional data, FAT updates, and the like. Here, M≥N. The main microcomputer 118 carries out the tuning after the moving image recording has started, at a time A2 when the data amount of the unrecorded moving image data stored in the moving image data buffer exceeds α MB. After the tuning is complete, at a time B2, the main microcomputer 118 requests the memory card controller 113 to write α MB of the moving image data into the flash memory card 115. In response to the write request from the main microcomputer 118, the memory card controller 113 reads out α MB of data from the moving image data buffer region in the DRAM 116 and writes that data into the flash memory card 115 in the period 501. After the write into the flash memory card 115 is complete, accesses of a small data size occur M times at a time C2. Accordingly, the main microcomputer 118 requests the memory card controller 113 to write the data into the flash memory card 115 without making a tuning request.

Figure 6:
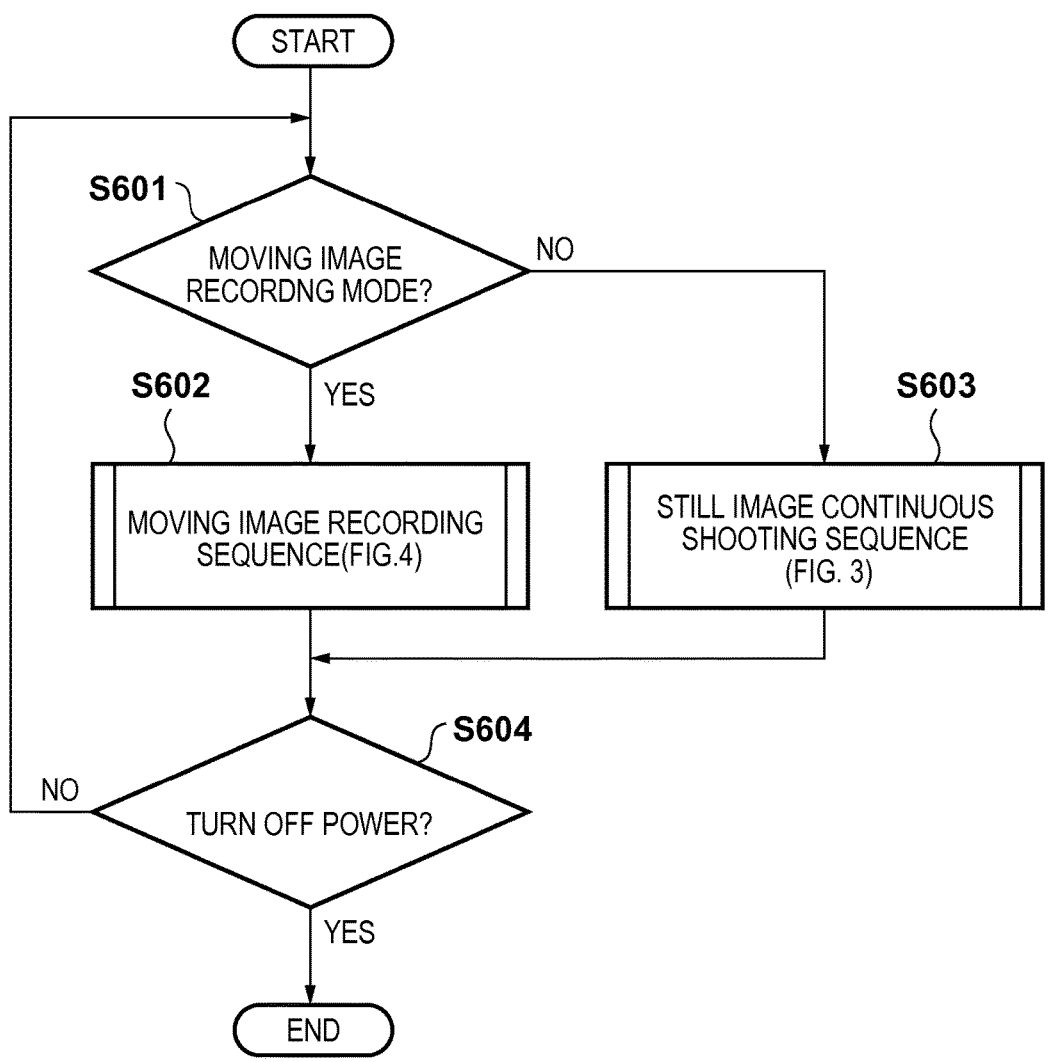
FIG. 6 is a flowchart illustrating a process for switching control of the execution of tuning based on a recording mode, according to the second embodiment.

Next, a process for switching control of the execution of tuning based on the recording mode will be described with reference to FIG. 6. The processing of this flowchart starts when the user selects a recording mode by operating the operation keys 117.

In step S601, the main microcomputer 118 determines whether or not the selected recording mode is the moving image recording mode. In the case where the selected recording mode is the moving image recording mode, the main microcomputer 118 executes the moving image recording sequence, or in other words, the processing in the flowchart shown in FIG. 4, in step S602. On the other hand, in the case where the selected recording mode is not the moving image recording mode (for example, in the case where the recording mode is a still image continuous shooting mode in which multiple pieces of still image data that are not encoded through interframe predictive encoding are recorded), the process moves to step S603. In step S603, the main microcomputer 118 executes the still image continuous shooting sequence, or in other words, the processing in the flowchart shown in FIG. 3.

When the process of step S602 or step S603 is complete, in step S604, the main microcomputer 118 determines whether or not a process for turning off power to the digital camera 100 has been instructed by the user operating the operation keys 117. The main microcomputer 118 returns to step S601 and repeats the series of processes in the case where the process for turning the power off has not been instructed. However, the processing of the flowchart ends in the case where the process for turning the power off has been instructed.

As described thus far, according to the second embodiment, the digital camera 100 switches control of the execution of tuning based on the recording mode. In the case where the recording mode is a data amount control recording mode such as the moving image shooting mode, the digital camera 100 periodically carries out tuning even if an image is being recorded. When such is not the case, the digital camera 100 carries out tuning in response to an error occurring when accessing the flash memory card 115.

As a result, the tuning is carried out periodically in the case where the tuning interfering with the writing of data does not pose a serious problem, and thus the likelihood of errors occurring when accessing the flash memory card 115 can be reduced.

Other Embodiments

Embodiments of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007273, filed Jan. 17, 2014, which is hereby incorporated by reference herein in its entirety.

What is claimed is:

1. A recording apparatus comprising:
   at least one processor; and
   at least one memory coupled to the at least one processor, the at least one memory having stored thereon instructions which, when executed by the at least one processor, cause the recording apparatus to:
   output a clock signal to a storage device;
   output, to the storage device, a write command and data to be written in accordance with the clock signal in order to write the data into the storage device;
   receive, in accordance with a timing signal, data for a response to the write command from the storage device;
   generate the timing signal by delaying the clock signal;
   detect an error regarding the data for the response to the write command;
   carry out an adjustment process on a delay amount in the timing signal in accordance with the detecting of an error; and
   initialize the storage device,
   wherein the adjustment process is carried out without an initializing process being carried out by the initializing in a case where the detected error is a predetermined type of error, and the adjustment process is carried out after the initializing process is carried out by the initializing in a case where the detected error is not the predetermined type of error.

2. The apparatus according to claim 1, wherein the predetermined type of error is an error detected in a case where a timing of the timing signal is inappropriate.

3. The apparatus according to claim 1, wherein the predetermined type of error is a command response CRC error, a read data CRC error, a command response timeout error, a read data timeout error, or a CRC status timeout error.

4. The apparatus according to claim 1, wherein the instructions, when executed by the at least one processor, further cause the recording apparatus to write data corresponding to the error into the storage device after the adjustment process is carried out.

5. The apparatus according to claim 4, wherein in a case where an error has been detected in response to the data corresponding to the error being written, outputting the data for writing the data into the storage device is stopped.

6. The apparatus according to claim 1, further comprising:
   a mounting mechanism for mounting the storage device to the recording apparatus and removing the storage device from the recording apparatus.

7. A recording apparatus comprising:
   at least one processor; and
   at least one memory coupled to the at least one processor, the at least one memory having stored thereon instructions which, when executed by the at least one processor, cause the recording apparatus to:
   output a clock signal to a storage device;
   output, to the storage device, a write command and data to be written in accordance with the clock signal in order to write the data into the storage device;
   receive, in accordance with a timing signal, data for a response to the write command from the storage device;
   generate the timing signal by delaying the clock signal;
   detect an error regarding the data for the response to the write command;
   carry out an adjustment process on a delay amount in the timing signal in accordance with the detecting of an error;
   obtain moving image data and still image data; and
   set one of a plurality of recording modes including a moving image recording mode and a still image recording mode,
   wherein in the moving image recording mode, the moving image data is output to the storage device in order to write the moving image data into the storage device in response to an instruction to start recording moving image and the output of the moving image data to the storage device is stopped in response to an instruction to stop recording moving image, and in the still image recording mode, in response to an instruction to continuously record still images, a plurality of frames of still image data is continuously output to the storage device in order to write the plurality of frames of still image data into the storage device, and
   wherein in the moving image recording mode, the adjustment process is carried out at a predetermined timing during a period from when the instruction to start recording moving image is made to when the instruction to stop recording moving image is made, and in the still image recording mode, the adjustment process is carried out in response to an error being detected by the detecting while the plurality of frames of still image data is being recorded.

8. The apparatus according to claim 7, wherein in the adjustment process, predetermined test data is requested from the storage device and the delay amount is adjusted in accordance with a result of receiving the predetermined test data which is sent from the storage device in response to the request for the predetermined test data and is received in accordance with the timing signal.

9. The apparatus according to claim 7, wherein the storage device sends data in accordance with the output clock signal.

10. The apparatus according to claim 7, wherein the storage device includes a memory card.

11. The apparatus according to claim 7, further comprising:
    an image capturing unit,
    wherein the moving image data and the still image data are obtained using image data output from the image capturing unit.

12. The apparatus according to claim 7, wherein the predetermined timing is a timing at which a data size has reached a predetermined threshold.

13. A recording apparatus comprising:
    at least one processor; and
    at least one memory coupled to the at least one processor, the at least one memory having stored thereon instructions which, when executed by the at least one processor, cause the recording apparatus to:
    output a clock signal to a storage device;
    output, to the storage device, a write command and data to be written in accordance with the clock signal in order to write the data into the storage device;
    receive, in accordance with a timing signal, data for a response to the write command from the storage device;
    generate the timing signal by delaying the clock signal;
    carry out an adjustment process on a delay amount in the timing signal;
    obtain moving image data; and
    set one of a plurality of recording modes including a moving image recording mode, wherein in the moving image recording mode, the moving image data is output to the storage device in order to write the moving image data into the storage device in response to an instruction to start recording a moving image and the output of the moving image data to the storage device is stopped in response to an instruction to stop recording a moving image, and wherein in the moving image recording mode, the adjustment process is carried out at a predetermined timing during a period from when the instruction to start recording the moving image is made to when the instruction to stop recording the moving image is made.

14. The apparatus according to claim 13, wherein the adjustment process is periodically carried out in the moving image recording mode.

15. The apparatus according to claim 13, wherein a control is carried out so that the moving image data is stopped from being output to the storage device while the adjustment process is carried out.

16. The apparatus according to claim 13, wherein the storage device includes a memory card.

17. The apparatus according to claim 13, further comprising:
an image capturing unit,
wherein the moving image data is obtained using image data output from the image capturing unit.

18. The apparatus according to claim 13,
wherein the plurality of recording modes includes a still image recording mode, and
wherein obtained still image data is output to the storage device in order to write the still image data into the storage device in accordance with a still image recording instruction.

19. A recording apparatus comprising:
at least one processor; and
at least one memory coupled to the at least one processor, the at least one memory having stored thereon instructions which, when executed by the at least one processor, cause the recording apparatus to:
output a clock signal to a storage device;
output, to the storage device, a write command and data to be written in accordance with the clock signal in order to write the data into the storage device;
receive, in accordance with a timing signal, data for a response to the write command from the storage device;
generate the timing signal by delaying the clock signal;
carry out an adjustment process on a delay amount in the timing signal; and
detect an error regarding the data for the response to the write command,
wherein the adjustment process includes a first processing method which adjusts the delay amount in response to the error being detected and a second processing method which adjusts the delay amount at a predetermined timing.

20. The apparatus according to claim 19, wherein the predetermined timing is a timing determined in accordance with a data size or a number of accesses to the storage device.

21. The apparatus according to claim 19, wherein the predetermined timing is a timing at which a data size has reached a predetermined threshold.

22. The apparatus according to claim 21, wherein the predetermined timing is a timing at which a data size of the data to be written into the storage device has reached the predetermined threshold.

23. The apparatus according to claim 19, wherein the instructions, when executed by the at least one processor, further cause the recording apparatus to:
carry out an initializing process on the storage device,
wherein in a case where the adjustment process is carried out in response to the error being detected, the initializing process is also carried out, and in a case where the adjustment process is carried out at the predetermined timing, the adjustment process is carried out without the initializing process being carried out.

24. The apparatus according to claim 23, wherein the initializing process is a process for resetting a state of the storage device.

25. The apparatus according to claim 23, further comprising a controller for controlling communication with the storage device,
wherein the initializing process is a process for resetting the controller.

26. The apparatus according to claim 23, wherein the initializing process is a process for resupplying power to the storage device.

27. The apparatus according to claim 19, wherein the instructions, when executed by the at least one processor, further cause the recording apparatus to:
switch between the first processing method and the second processing method in accordance with a mode of the recording apparatus.

* * * * *